United States Patent
Kass et al.

(10) Patent No.: US 10,703,670 B2
(45) Date of Patent: Jul. 7, 2020

(54) PROCESS FOR PRODUCING ALKALI METAL-RICH ALUMINOSILICATE GLASSES, ALKALI METAL-RICH ALUMINOSILICATE GLASSES AND USE THEREOF

(71) Applicant: SCHOTT AG, Mainz (DE)

(72) Inventors: Christof Kass, Tirschenreuth (DE); Rainer Eichholz, Frankfurt am Main (DE)

(73) Assignee: SCHOTT AG, Mainz (DE)

( * ) Notice: Subject to any disclaimer, the term of this patent is extended or adjusted under 35 U.S.C. 154(b) by 52 days.

(21) Appl. No.: 15/900,801

(22) Filed: Feb. 21, 2018

(65) Prior Publication Data

US 2018/0257976 A1   Sep. 13, 2018

(30) Foreign Application Priority Data

Mar. 10, 2017  (DE) .................. 10 2017 203 997

(51) Int. Cl.

| | |
|---|---|
| *C03C 3/095* | (2006.01) |
| *C03C 3/11* | (2006.01) |
| *C03C 3/087* | (2006.01) |
| *C03C 3/097* | (2006.01) |
| *C03C 1/00* | (2006.01) |
| *A61J 1/14* | (2006.01) |
| *C03B 19/02* | (2006.01) |
| *C03C 4/20* | (2006.01) |

(52) U.S. Cl.
CPC .............. *C03C 3/11* (2013.01); *A61J 1/1468* (2015.05); *C03B 19/02* (2013.01); *C03C 1/004* (2013.01); *C03C 3/087* (2013.01); *C03C 3/095* (2013.01); *C03C 3/097* (2013.01); *C03C 4/20* (2013.01); *C03C 2204/00* (2013.01)

(58) Field of Classification Search
CPC ......... C03C 3/083; C03C 3/085; C03C 3/087; C03C 3/097; C03C 3/095; C03C 3/11
See application file for complete search history.

(56) References Cited

U.S. PATENT DOCUMENTS

| | | |
|---|---|---|
| 4,057,408 A | 11/1977 | Pierson et al. |
| 4,212,919 A | 7/1980 | Hoda |
| 5,599,753 A | 2/1997 | Watzke et al. |
| 2009/0075805 A1 | 3/2009 | Kurachi et al. |
| 2011/0098172 A1* | 4/2011 | Brix ................ C03C 3/087 501/57 |
| 2013/0101596 A1 | 4/2013 | DeMartino |
| 2014/0323287 A1* | 10/2014 | Tratzky ............... C03C 3/11 501/67 |
| 2014/0339122 A1* | 11/2014 | Weeks ............. C07K 16/244 206/524.1 |
| 2015/0166400 A1 | 6/2015 | Yamamoto |

FOREIGN PATENT DOCUMENTS

| | | |
|---|---|---|
| CN | 106587597 A | 4/2017 |
| CZ | 278452 B6 | 1/1994 |
| DE | 44 30 710 C1 | 5/1996 |
| JP | 2007246365 A | 9/2007 |

OTHER PUBLICATIONS

"Glastechnische Fabrikationsfehler" H. Jebsen-Marwedel and R. Brückner, 3. Auflage, 1980, Springer-Verlag, Seite 195ff.

* cited by examiner

*Primary Examiner* — Elizabeth A. Bolden

(57) ABSTRACT

The invention relates to a process for producing alkali metal-rich aluminosilicate glasses having a content (in mol % based on oxide) of alkali metal oxides of 4-16 mol %, of $Al_2O_3$ of at least 4 mol % and of $B_2O_3$ of 0-4 mol %, wherein 0.15 mol % to 0.9 mol % of chloride(s) and at least one refining agent from the group of sulfate(s) (reported as $SO_3$), $CeO_2$ are added to the glass batch and wherein the sum total of refining agents added in the batch is 0.17 mol % to 1.3 mol %.

8 Claims, No Drawings

PROCESS FOR PRODUCING ALKALI METAL-RICH ALUMINOSILICATE GLASSES, ALKALI METAL-RICH ALUMINOSILICATE GLASSES AND USE THEREOF

This application claims priority of German patent application DE 10 2017 203 997.3 filed Mar. 10, 2017.

TECHNICAL FIELD OF THE INVENTION

The invention relates to a process for producing alkali metal-rich aluminosilicate glasses having a content (in mol % based on oxides) of alkali metal oxides of 4-16 mol %, of $Al_2O_3$ of at least 4 mol % and of $B_2O_3$ of 0-4 mol % with addition of at least two refining agents to the batch formulation. The invention also relates to alkali metal-rich aluminosilicate glass compositions and to the use thereof.

BACKGROUND OF THE INVENTION

Field of the Invention

Processes for producing glasses have the process steps of formulating the batch, also called batch charging, melting the glass batch and the subsequent hot-forming thereof. The term "melting" here also encompasses the steps of refining, homogenizing and conditioning that follow on from the initial melting for further processing.

In relation to melts, refining is understood to mean the removal of gas bubbles from the melt. In order to achieve maximum freedom from extraneous gas and bubbles, the thorough mixing and degassing of the molten batch is required. The behaviour of gases or bubbles in the gas melt and the removal thereof are described, for example, in "Glastechnische Fabrikationsfehler" [Fabrication Defects In Glass Technology], edited by H. Jebsen-Marwedel and R. Brückner, 3rd edition, 1980, Springer-Verlag, pages 195 et seq.

There are two basically different refining methods that are commonly known, and these differ essentially by the manner of refining gas production:

In mechanical refining, gases, for example water vapour, oxygen, nitrogen or air, are injected through openings in the base of the melting unit. This is called the "bubbling" method.

Chemical refining methods are the most common. The principle involved is to add to the melt, or directly to the batch, compounds that break down in the melt and release gases, or compounds that are volatile at relatively high temperatures, or compounds that release gases in an equilibrium reaction at relatively high temperatures.

This increases the volume of bubbles present and increases the buoyancy thereof.

The latter compounds include what are called the redox refining agents, for example arsenic oxide, antimony oxide or else cerium oxide. The redox refining agents used here are oxides of polyvalent ions which can occur in at least two oxidation states in a temperature-dependent equilibrium with one another, with release of oxygen at high temperatures.

The second group of compounds, the compounds that are volatile and thereby active at higher temperatures, includes, for example, chlorides, e.g. sodium chloride. They are referred to collectively by the term "evaporative refining agents".

The former manner of chemical refining, i.e. refining by means of compounds that break down and release gases, includes sulfate refining.

The respective refining method is tied to the temperatures at which the corresponding redox, evaporation or breakdown processes proceed owing to the thermodynamic circumstances. For instance, soda-lime glasses or other relatively low-melting glasses, for example borate glasses, can be refined with evaporative refining agents. Redox refining agents frequently exhibit a low reabsorption effect at relatively high temperatures, meaning that their ability to reabsorb oxygen or other gases from the small bubbles present in the melt is insufficient in many high-melting glasses. Sulfate refining is also used for low-melting glasses inter alia, for instance for soda-lime glasses, since the $Na_2SO_4$ which is typically used reacts with the ever-present $SiO_2$ even at low temperatures compared to $Na_2SO_4$ which is relatively stable on its own, and releases oxygen and $SO_2$.

Description of the Related Art

The patent literature describes refining methods for various glass types, which are suitable for the respective melting characteristics that result from the viscosity profile. It will be apparent from what has been outlined that an exact assessment of the specific glass composition is always necessary.

DE 44 30 710 C1 describes the refining of low-boron borosilicate glasses with the evaporative refining agents chloride and/or fluoride.

US 2013/010596 A describes low-boron and boron-free alkali metal-containing aluminosilicate glasses. They are refined with tin oxide. They are described as usable for pharmaceutical vessels, even though tin ions are known to be able to cause unwanted reactions in contact with some active ingredients dispensed in the glass vessel.

SUMMARY OF THE INVENTION

The problem addressed by the invention is thus that of providing a process for producing alkali metal-rich aluminosilicate glasses, in which the glass melt is effectively refined, i.e. one which results in glass having high quality with respect to freedom from or deficiency of bubbles and which enables inexpensive refining of the glass melts of the alkali metal-rich aluminosilicate glasses. Another problem addressed by the invention is that of providing such glasses.

The problem is solved by the process according to Embodiment 1 and the glass composition according to Embodiment 2 or Embodiment 3, and by the product of Embodiment 4.

These and other aspects and objects, features and advantages of the present invention will become apparent upon a consideration of the following detailed description and the invention.

It is to be understood that both the foregoing general description and the following detailed description are merely exemplary of the invention, and are intended to provide an overview or framework for understanding the nature and character of the invention as claimed.

DETAILED DESCRIPTION OF PREFERRED EMBODIMENTS

Embodiment 1

Process for producing alkali metal-rich aluminosilicate glasses having a content (in mol % based on oxides) of alkali metal oxides of 4-16 mol %, of $Al_2O_3$ of at least 4 mol % and of $B_2O_3$ of 0-4 mol %, comprising the process steps of formulating a batch with addition of at least two refining agents, melting the batch and then hot-forming the molten batch, characterized in that the at least two refining agents comprise a) 0.15 mol % to 0.9 mol % of chloride(s) and b) at least one compound from the group of sulfate(s) (reported as $SO_3$) and $CeO_2$, where the sum total of refining agents added in the batch is 0.17 mol % to 1.3 mol %.

Embodiment 2

Alkali metal-rich aluminosilicate glass comprising (in mol % based on oxides):

| | |
|---|---|
| $SiO_2$ | 64-78 |
| $Al_2O_3$ | 4-14 |
| $B_2O_3$ | 0-4 |
| $Na_2O$ | 4-14 |
| $K_2O$ | 0-3 |
| $Li_2O$ | 0-3 |
| with $Na_2O + K_2O + Li_2O$ | 4-16 |
| MgO | 0-14 |
| CaO | 0-12 |
| BaO | 0-4 |
| SrO | 0-6 |
| $TiO_2$ | 0-2 |
| $ZrO_2$ | 0-1 |
| $SnO_2$ | 0-0.4 |
| Cl | 0.07-0.5 |
| $CeO_2$ | 0-0.1 |
| $SO_3$ | 0-0.01 |
| with $SO_3 + CeO_2$ | 0.002-0.1. |

Embodiment 3

Alkali metal-rich aluminosilicate glass comprising (in mol % based on oxides) alkali metal oxides of 4-16 mol %, $Al_2O_3$ of at least 4 mol %, $B_2O_3$ of 0-4 mol %, and at least two refining agents comprising a) 0.15 to 0.9 mol % of chloride(s) and b) at least one compound from the group of sulfate(s) (reported as $SO_3$) and $CeO_2$, where the sum total of refining agents is 0.17 mol % to 1.3 mol %.

Embodiment 4

Pharmaceutical packaging comprising an alkali metal-rich aluminosilicate glass produced by Embodiment 1 comprising an alkali metal-rich aluminosilicate glass of Embodiment 2 or Embodiment 3. The pharmaceutical packaging may be a bottle, a syringe, a carpule, an ampoule, a chemically tempered glass, a substrate, a superstrate, an electrical engineering cover, or a tubing glass.

In the process of the invention for producing alkali metal-rich aluminosilicate glasses comprising the process steps of formulating the batch with addition of at least two refining agents, melting the glass batch and then hot-forming the molten glass batch, the term "melting" being used collectively not only for the fusion of the raw materials and shards but also for the subsequent steps of refining and homogenizing, the at least two refining agents added to the glass batch comprise a) 0.15 mol % to 0.9 mol % of chloride(s) and b) at least one refining agent from the group of sulfate(s) (reported as $SO_3$), $CeO_2$, wherein the sum total of refining agents added in the batch is 0.17 mol % to 1.3 mol %.

Preference is given to adding 0.17 mol % to 1.1 mol % of refining agents to the batch, more preferably up to 0.8 mol % of refining agents.

Preferably, the sum total of refining agents added results from the amount of chloride(s) and $CeO_2$ or of chloride(s) and sulfate(s) or of chloride(s) and $CeO_2$ and sulfate(s) added.

"Alkali metal-rich" is understood here to mean a content of alkali metal oxides of 4 mol % to 16 mol %, where the sum total of the alkali metal oxides is calculated from $Na_2O$ and/or $K_2O$ and/or $Li_2O$, preferably from $Na_2O$ and/or $K_2O$. Preferably, the sum total of the alkali metal oxides is at least 8 mol %.

Aluminosilicate glass is understood here to mean, especially as opposed to borosilicate glasses and aluminoborosilicate glasses, a glass having a boron content of 0 mol % to 4 mol % of $B_2O_3$ and a content of at least 4 mol % of $Al_2O_3$. Preference is given to a $B_2O_3$ content of 0 to less than 2.7 mol %. The glass is more preferably boron-free. Preference is given to an $Al_2O_3$ content of at least 5 mol %. Preference is given to an $Al_2O_3$ content of at most 14 mol %.

The glasses described here have adequate chemical stability, such that they are suitable as display glass or as a primary packaging material in the pharmaceutical industry, and they are producible in conventional melting plants at melting temperatures that are not excessively high. They preferably have good chemical temperability.

The inventors have found that, surprisingly, mixed refining with not only chloride but also at least one further refining agent from the group of sulfate(s), $CeO_2$ leads to distinctly better results than the refining methods used in the prior art, and also pure chloride refining. This is surprising especially in that each of these refining agents individually is of good suitability for low-melting glasses and this should not change even in combination of the refining agents owing to the specific effectiveness maximum of each.

If sulfate is used as a further refining agent as well as chloride, preferably between 0.01 mol % and 0.08 mol %, more preferably between 0.02 mol % and 0.05 mol %, of sulfate(s) is added to the batch.

If cerium oxide is used as well as chloride as a further refining agent, the $CeO_2$ content in the batch is preferably between 0.01 mol % and 0.1 mol %, more preferably between 0.02 mol % and 0.04 mol %.

If the refining agents used are cerium oxide and sulfate as well as chloride, it is possible to use the same individual contents in the batch, i.e. 0.15 mol % to 0.9 mol % of chloride(s), 0.01 mol % to 0.08 mol % of sulfate(s) and 0.01 mol % to 0.1 mol % of cerium oxide, and in a particularly preferred embodiment it is possible to restrict the chloride content in the batch to 0.2 mol %.

The chloride can be added in the form of one or more chlorides, for example NaCl or other alkali metal or alkaline earth metal chlorides, preference being given to use in the form of NaCl.

If sulfate is used, the sulfate can be added in the form of one or more sulfates, e.g. $CaSO_4$, $MgSO_4$, $Na_2SO_4$, $SrSO_4$, $BaSO_4$, preference being given to the use of $Na_2SO_4$. The sulfate used has to be selected such that its breakdown temperature is matched to the viscosity of the glass melt or to the refining temperature of the glass.

Preferably, the glasses produced by the process of the invention are melted at a temperature of at least 1640° C.

Preferably, the glasses produced by the process of the invention are melted at a temperature of at most 1680° C.

It is also possible to add further refining agents, for example fluoride, or such as $As_2O_3$ and $Sb_2O_3$.

Preference is given to using no fluoride apart from unavoidable impurities, since fluoride-free glass is demanded for some applications in the pharmaceutical industry.

Preference is given to using neither $As_2O_3$ nor $Sb_2O_3$ apart from unavoidable impurities, since these substances are hazardous to the environment.

Unavoidable impurities are understood in this application to mean those impurities that are caused by the nature of the glass production, i.e. especially those that are introduced by the raw materials used or by the operation of the melting unit and that cannot be avoided at economically acceptable cost, if at all. According to the purity of the raw materials used, such unavoidable impurities are limited to a maximum of 1 mol %, preferably to 0.5 mol %, further preferably to 0.1 mol %, or even to 0.05 mol %, individually or in total.

Preference is given to using the process according to the invention to melt an aluminosilicate glass containing at least 64 mol % of $SiO_2$. A minimum content of 64 mol % of $SiO_2$ is advisable for good chemical stability. Preference is given to using the process according to the invention to melt an aluminosilicate glass containing not more than 78 mol % of $SiO_2$. Over and above an $SiO_2$ content exceeding 78 mol %, there is a significant rise in the processing temperature, which makes it difficult to implement production in standard melting units. Preference is given to an $SiO_2$ content of not more than 77 mol %.

Preference is given to using the process according to the invention to melt an aluminosilicate glass containing at least 4 mol % of $Al_2O_3$ and at most 14 mol % of $Al_2O_3$. The minimum content is chosen such that the glass structure is supported, i.e. better crosslinking and excellent hydrolytic stability is achieved.

Preference is given to using the process according to the invention to melt an aluminosilicate glass containing 0 mol % of $B_2O_3$ to 4 mol % of $B_2O_3$. Preference is given to a $B_2O_3$ content of 0% to less than 2.7 mol %. More preferably, the glass is boron-free.

Preference is given to using the process according to the invention to melt an aluminosilicate glass containing at least 4 mol % of $Na_2O$. This minimum content of $Na_2O$ has the advantage of assuring a low viscosity in the melting operation, and secondly of assuring low leaching characteristics in the production of pharmaceutical glasses and the customary further processing steps (washing processes, chemical tempering). Preference is given to using the process according to the invention to melt an aluminosilicate glass containing not more than 14 mol % of $Na_2O$. If this maximum content is exceeded, there is a drop in the hydrolytic stability. Preference is given to an $Na_2O$ content of not more than 13.7 mol %.

Preference is given to using the process according to the invention to melt an aluminosilicate glass containing 0 mol % of $K_2O$ to 3 mol % of $K_2O$. A higher potassium content would impair ion exchange in the salt bath and hence be detrimental to tempering. In some particularly preferred embodiments, the glass is $K_2O$-free.

Preference is given to using the process according to the invention to melt an aluminosilicate glass containing 0 mol % of $Li_2O$ to 3 mol % of $Li_2O$. A higher lithium content would have an adverse effect on the chemical stability of the glass. It is preferable that the glass is lithium-free.

Preference is given to using the process according to the invention to melt an aluminosilicate glass containing 0 mol % of MgO to 14 mol % of MgO. Preference is given to the presence of MgO at at least 0.3 mol %. The minimum content of MgO has the advantage that the processing temperature is reduced. In some embodiments, the presence of MgO at least 3 mol % is particularly preferred. In the case of a content of more than 14 mol % of MgO, by contrast, there can be crystallization. Preference is given to a maximum content of 7 mol %. In some embodiments, particular preference is given to a maximum content of 6.3 mol % and very particular preference to a maximum content of 0.8 mol %.

Preference is given to using the process according to the invention to melt an aluminosilicate glass containing 0 mol % of CaO to 12 mol % of CaO. Preference is given to the presence of CaO at at least 1 mol %, more preferably at at least 2 mol %. A minimum content of CaO has the advantage that the processing temperature is lowered without worsening neutrality too significantly. In the case of a content of more than 12 mol % of CaO, there can be a distinct deterioration in neutrality. If the glasses are to be chemically tempered, high CaO concentrations have the drawback that the calcium ions become involved in the ion exchange, disrupt the hardening of the glass and contaminate the salt bath. Preference is given to a maximum content of 8 mol %, particular preference to a maximum content of 5 mol %.

Preference is given to using the process according to the invention to melt an aluminosilicate glass containing 0 mol % of BaO to 4 mol % of BaO. It is preferable that the glass is barium-free. Barium is undesirable for some applications in the pharmaceutical industry since barium ions cause precipitation and hence turbidity in contact with some active ingredients dispensed in the glass vessel.

Preference is given to using the process according to the invention to melt an aluminosilicate glass containing 0 mol % of SrO to 6 mol % of SrO. It is preferable that the glass is strontium-free. The use of strontium-containing glasses for pharmaceutical primary packaging means is unusual since strontium ions can also cause unwanted reactions in contact with some active ingredients dispensed in the glass vessel.

Preference is given to using the process according to the invention to melt an aluminosilicate glass containing 0 mol % of $ZrO_2$ to 1 mol % of $ZrO_2$. It is preferable that the glass is free of $ZrO_2$. $ZrO_2$ increases the melting temperature.

Preference is given to using the process according to the invention to melt an aluminosilicate glass containing 0 mol % of $SnO_2$ to 0.4 mol % of $SnO_2$. It is preferable that the glass is free of $SnO_2$. The use of $SnO_2$ should be avoided in pharmaceutical primary packaging means, since tin ions can also cause unwanted reactions in contact with some active ingredients dispensed in the glass vessel.

Preference is given to using the process according to the invention to melt an aluminosilicate glass containing 0 mol % of $TiO_2$ to 2 mol % of $TiO_2$. Small additions of titanium oxide $TiO_2$ can improve the hydrolytic stability of the glass and support the achievement of a viscosity suitable for processing. According to the application, the use of titanium oxide is dispensed with entirely.

Preference is thus given to using the process according to the invention to melt an aluminosilicate glass containing, as well as alkali metal oxides at 4-16 mol %, $Al_2O_3$ at at least 4 mol % and $B_2O_3$ at 0-4 mol % (in mol % based on oxide), in its base composition (in mol % based on oxide):

| | |
|---|---|
| $SiO_2$ | 64-78 |
| $Al_2O_3$ | 4-14 |
| $Na_2O$ | 4-14 |
| $K_2O$ | 0-3 |
| $Li_2O$ | 0-3 |

| | |
|---|---|
| MgO | 0-14 |
| CaO | 0-12 |
| BaO | 0-4 |
| SrO | 0-6 |
| TiO$_2$ | 0-2 |
| ZrO$_2$ | 0-1 |
| SnO$_2$ | 0-0.4. |

Preference is thus given to using the process according to the invention to melt an aluminosilicate glass comprising (in mol % based on oxides) alkali metal oxides of 4-16 mol %, Al$_2$O$_3$ of at least 4 mol %, B$_2$O$_3$ of 0-4 mol %, and at least two refining agents comprising a) 0.15 to 0.9 mol % of chloride(s) and b) at least one compound from the group of sulfate(s) (reported as SO$_3$) and CeO$_2$, where the sum total of refining agents is 0.17 mol % to 1.3 mol %.

Preference is given to a process in which, apart from unavoidable impurities, neither BaO, nor SrO, nor Li$_2$O, nor ZrO$_2$, nor SnO$_2$ is added, such that the glass produced, apart from unavoidable impurities, comprises neither BaO, nor SrO, nor Li$_2$O, nor ZrO$_2$, nor SnO$_2$.

In a preferred embodiment of the process of the invention, an aluminosilicate glass is melted, comprising, as well as alkali metal oxides at 8-24 mol %, preferably Na$_2$O+K$_2$O at 8-24 mol %, in its base composition (in mol % based on oxide):

| | |
|---|---|
| SiO$_2$ | 64-78 |
| Al$_2$O$_3$ | 5-14 |
| Na$_2$O | 4-12 |
| K$_2$O | 0.5-3 |
| MgO | 0-14 |
| CaO | 1-12 |
| TiO$_2$ | 0-2. |

In another preferred embodiment of the process of the invention, an aluminosilicate glass is melted, comprising, in its base composition (in mol % based on oxide):

| | |
|---|---|
| SiO$_2$ | 67-78 |
| B$_2$O$_3$ | 0-4 |
| Al$_2$O$_3$ | 4-9 |
| Na$_2$O | 8.5-13.7 |
| K$_2$O | 0-1 |
| MgO | 3-7 |
| CaO | 0-5. |

For most components, the proportions of the components in the batch, in the glass melt and in the product remain the same. This is not the case for volatile compounds such as chloride or for components that break down, such as sulfate. The person skilled in the art is aware that these losses have to be taken into account.

For instance, the abovementioned proportions of chloride and sulfate in the batch lead to contents of 0.07 mol % to 0.8 mol % of chloride and 0.002 mol % to 0.008 mol % of sulfate (reported as SO$_3$) in the glass.

The CeO$_2$ refining agent, if present, remains at a constant content.

Therefore, the statements made with regard to the individual glass components in the outlining of the process according to the invention, with the exceptions of chloride and sulfate, are also applicable to the glasses according to the invention.

The invention thus also relates to an aluminosilicate glass comprising (in mol % based on oxide):

| | |
|---|---|
| SiO$_2$ | 64-78 |
| Al$_2$O$_3$ | 4-14 |
| B$_2$O$_3$ | 0-4 |
| Na$_2$O | 4-14 |
| K$_2$O | 0-3 |
| Li$_2$O | 0-3 |
| with Na$_2$O + K$_2$O + Li$_2$O | 4-16 |
| MgO | 0-14 |
| CaO | 0-12 |
| BaO | 0-4 |
| SrO | 0-6 |
| TiO$_2$ | 0-2 |
| ZrO$_2$ | 0-1 |
| SnO$_2$ | 0-0.4 |
| Cl | 0.07-0.5 |
| CeO$_2$ | 0-0.1 |
| SO$_3$ | 0-0.01 |
| with SO$_3$ + CeO$_2$ | 0.002-0.1. |

It is preferable that the glass does not comprise, apart from unavoidable impurities, any BaO and/or any SrO and/or any Li$_2$O and/or any ZrO$_2$ and/or any SnO$_2$.

It is more preferable that the glass, apart from unavoidable impurities, comprises neither BaO, nor SrO, nor Li$_2$O, nor ZrO$_2$, nor SnO$_2$.

In a preferred embodiment, the aluminosilicate glass according to the invention comprises (in mol % based on oxide):

| | |
|---|---|
| SiO$_2$ | 64-78 |
| Al$_2$O$_3$ | 5-14 |
| Na$_2$O | 4-12 |
| K$_2$O | 0.5-3 |
| with Na$_2$O + K$_2$O | 4-16 |
| MgO | 0-14 |
| CaO | 1-12 |
| TiO$_2$ | 0-2 |
| Cl | 0.07-0.5 |
| CeO$_2$ | 0-0.1 |
| SO$_3$ | 0-0.01 |
| with SO$_3$ + CeO$_2$ | 0.002-0.1. |

In another preferred embodiment, the aluminosilicate glass according to the invention comprises (in mol % based on oxide):

| | |
|---|---|
| SiO$_2$ | 67-78 |
| B$_2$O$_3$ | 0-4 |
| Al$_2$O$_3$ | 4-9 |
| Na$_2$O | 8.5-13.7 |
| K$_2$O | 0-1 |
| MgO | 3-7 |
| CaO | 0-5 |
| Cl | 0.07-0.5 |
| CeO$_2$ | 0-0.1 |
| SO$_3$ | 0-0.008 |
| with SO$_3$+ CeO$_2$ | 0.002-0.1. |

In further preferred embodiments, the glasses of the composition ranges outlined consist essentially of the components mentioned in the composition ranges specified in each case. "Essentially consisting of" means that the components listed are at least 96% of the overall composition.

In further preferred embodiments, the glasses of the composition ranges outlined consist of the components mentioned in the composition ranges specified in each case.

The process serves more particularly for the production of glasses having a melting temperature of at least 1640° C.

The process serves more particularly for the production of glasses having good chemical stability, especially having hydrolytic stability according to DIN ISO 720 HGA1.

The process serves more particularly for the production of chemically temperable glasses. In chemical tempering, for example, a certain proportion of the sodium ions are replaced by potassium ions by ion exchange, for example in a salt bath, which leads to compressive stress in the glass owing to the larger potassium ions.

The process step of hot forming mentioned covers a wide variety of different standard methods of hot forming, such as drawing to give tubes or to give strips, or floating or rolling, casting, blowing, pressing, as appropriate according to the end use of the glasses, flat glasses or hollow glasses produced. The person skilled in the art knows how to select the suitable glass composition for the respective end use and to correspondingly choose the parameters of the process step of hot forming.

The glasses produced by the process according to the invention and the glasses according to the invention are particularly suitable for use
- as primary pharmaceutical packaging means, especially as a bottle, syringe, carpule or ampoule,
- as a chemically temperable glass,
- as a substrate, superstrate or cover, especially for electrical engineering applications, for PDP or OLED screens, and for photovoltaics,
- as tubing glass for other applications, especially for lamps, halogen lamps or fluorescent tubes, or for solar-thermal applications.

The entire disclosures of all applications, patents and publications, cited above and below, and of corresponding German application 10 2017 203 997.3 filed Mar. 10, 2017, are hereby incorporated by reference.

The present invention will be illustrated below by a series of examples. However, the present invention is not limited to the examples mentioned.

EXAMPLES

The invention is to be elucidated further with reference to working examples and comparative examples.

The base compositions used for the working examples and comparative examples were the following base compositions G1 and G2, both in mol % based on oxide:

G1: $SiO_2$: 68.9; $Al_2O_3$: 11.55; $Na_2O$: 9.55; $K_2O$: 1.1; MgO: 0.5; CaO: 7.3; $TiO_2$: 1.05.

G2: $SiO_2$: 75.7; $Al_2O_3$: 5.9; $Na_2O$: 11.4; $K_2O$: 0.1; MgO: 6.6; CaO: 0.3.

All examples were melted and refined between 1640° C. and 1680° C. in an electrical test furnace with a batch for 1 kg of glass in each case. The melting time was about five hours excluding charge time. Insertion of the crucible with about one third of the batch was followed by two further charges. The time from the first insertion of the crucible to the last charge, i.e. the charge time, was two hours. After the melting, the glasses were cast into blocks having a thickness of 2 cm. In all examples, the following raw materials were used: quartz sand, aluminium oxide, sodium carbonate, potassium nitrate, dolomite, calcium carbonate, anatase. The chloride used was NaCl. The sulfate used was $Na_2SO_4$. The cerium oxide used was $CeO_2$.

Using the constituents mentioned in the proportions mentioned (in mol %), the following examples were produced (sulfate always reported as $SO_3$) (any apparent sum total>100% was corrected to 100% in each case by reducing the $SiO_2$ content in G):

A1 G1 or G2, in each case+0.28 mol % of chloride+0.025 mol % of sulfate
A2 G1 or G2, in each case+0.37 mol % of chloride+0.02 mol % of $CeO_2$
A3 G1 or G2, in each case+0.19 mol % of chloride+0.025 mol % of sulfate+0.02 mol % of $CeO_2$
A4 G1 or G2, in each case+0.5 mol % of chloride+0.02 mol % of sulfate+0.02 mol % of $CeO_2$
A5 G1 or G2, in each case+0.3 mol % of chloride+0.02 mol % of sulfate+0.06 mol % of $CeO_2$
V1 G1+0.55 mol % of chloride
V2 G1+0.07 mol % of sulfate
V3 G1+0.1 mol % of $SnO_2$ The bubbles visible to the naked eye in the blocks cast were counted.

The result
A1 0 bubbles/$cm^3$
A2 0 bubbles/$cm^3$
A3 0 bubbles/$cm^3$
A4 0 bubbles/$cm^3$
A5 0 bubbles/$cm^3$
V1 1 bubble/$cm^3$
V2 5 bubbles/$cm^3$
V3 3 bubbles/$cm^3$ shows the particular refining effect of the mixed refining according to the invention. Both the chloride-cerium refining (A2) and the chloride-sulfate refining (A1) show very good results not just in comparison to pure chloride refining (V1) and to tin oxide refining (V3) but also in absolute terms with their freedom from bubbles. This freedom from bubbles is also achieved by the cerium-chloride-sulfate refining (A3-A5). This latter mixed refining method has the additional advantage that it requires less chloride for the same good result. This is advantageous for process-related reasons, and also for reasons of environmental protection. And the glass obtained also contains less chloride, which means that fewer evaporation products form in production as a glass tube and further processing thereof. Such evaporation products would settle out on the inner glass wall of the glass tubes and the vessels produced therefrom and form unwanted "lamp rings".

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Alkali metal-rich aluminosilicate glass comprising (in mol % based on oxides):

| | |
|---|---|
| $SiO_2$ | 64-78 |
| $Al_2O_3$ | 4-14 |
| $B_2O_3$ | 0-4 |
| $Na_2O$ | 4-14 |
| $K_2O$ | 0-3 |
| $Li_2O$ | 0-3 |
| with $Na_2O + K_2O + Li_2O$ | 4-16 |
| MgO | 0-14 |
| CaO | 0-12 |
| BaO | 0-4 |
| SrO | 0-6 |
| $TiO_2$ | 0-2 |
| $ZrO_2$ | 0-1 |

-continued

| | |
|---|---|
| SnO$_2$ | 0-0.4 |
| Cl | 0.07-0.8 |
| CeO$_2$ | 0.01-0.1 |
| SO$_3$ | 0-0.01 |
| with SO$_3$ + CeO$_2$ | 0.01-0.11. |

2. Aluminosilicate glass according to claim 1, comprising (in mol % based on oxides):

| | |
|---|---|
| SiO$_2$ | 64-78 |
| Al$_2$O$_3$ | 5-14 |
| Na$_2$O | 4-12 |
| K$_2$O | 0.5-3 |
| with Na$_2$O + K$_2$O | 4-15 |
| MgO | 0-14 |
| CaO | 1-12 |
| TiO$_2$ | 0-2 |
| Cl | 0.07-0.8 |
| CeO$_2$ | 0.01-0.1 |
| SO$_3$ | 0-0.01 |
| with SO$_3$ + CeO$_2$ | 0.01-0.11. |

3. Aluminosilicate glass according to claim 1, comprising (in mol % based on oxides):

| | |
|---|---|
| SiO$_2$ | 67-78 |
| B$_2$O$_3$ | 0-4 |
| Al$_2$O$_3$ | 4-9 |
| Na$_2$O | 8.5-13.7 |
| K$_2$O | 0-1 |
| MgO | 3-7 |
| CaO | 0-5 |
| Cl | 0.07-0.8 |
| CeO$_2$ | 0.01-0.1 |
| SO$_3$ | 0-0.01 |
| with SO$_3$ + CeO$_2$ | 0.01-0.11. |

4. Pharmaceutical packaging comprising an alkali metal-rich aluminosilicate glass of claim 1.

5. Pharmaceutical packaging of claim 4, wherein the pharmaceutical packaging is a bottle, a syringe, a carpule, an ampoule, a chemically tempered glass, a substrate, a superstrate, an electrical engineering cover, or a tubing glass.

6. Alkali metal-rich aluminosilicate glass comprising (in mol % based on oxides) alkali metal oxides of 4-16 mol %, Al$_2$O$_3$ of at least 4 mol %, B$_2$O$_3$ of 0-4 mol %, and at least two refining agents comprising 0.07 to 0.8 mol % of chloride(s) and 0.01 to 0.1 mol % of CeO$_2$.

7. Alkali metal-rich aluminosilicate glass according to claim 6, characterized in that the sum total of refining agents is 0.17 mol % to 1.3 mol %.

8. Alkali metal-rich aluminosilicate glass according to claim 6, characterized in that at least one compound from the group of sulfate(s) (reported as SO$_3$) is added to the batch.

\* \* \* \* \*